United States Patent [19]

Yamanaka

[11] Patent Number: 5,036,343
[45] Date of Patent: Jul. 30, 1991

[54] CAMERA WITH SIDE-MOUNTED BALANCER

[75] Inventor: Toshimasa Yamanaka, Tokyo, Japan

[73] Assignee: Asahi Kogaku Kogyo K.K., Tokyo, Japan

[21] Appl. No.: 614,554

[22] Filed: Nov. 15, 1990

Related U.S. Application Data

[63] Continuation of Ser. No. 373,706, Jun. 23, 1989, abandoned, which is a continuation of Ser. No. 241,728, Sep. 8, 1988, abandoned.

[30] Foreign Application Priority Data

Sep. 6, 1987 [JP] Japan .............. 62-136194[U]
Sep. 16, 1987 [JP] Japan .............. 62-229700

[51] Int. Cl.$^5$ ............................ G03B 21/14
[52] U.S. Cl. ............................ 354/82; 354/288;
354/145.1; 354/126; 352/243; 358/229
[58] Field of Search .......... 354/82, 132, 202, 288,
354/145.1, 126, 484; 352/243; 358/229, 906, 909

[56] References Cited

U.S. PATENT DOCUMENTS

| 3,852,788 | 12/1974 | Ueda | 354/126 X |
| 3,988,751 | 10/1976 | Goto | 354/82 |
| 4,645,321 | 2/1987 | Fukita | 354/293 X |
| 4,672,436 | 6/1987 | Hawthorne | 354/293 X |

FOREIGN PATENT DOCUMENTS

| 516239 | 9/1953 | Italy | 354/288 |
| 55-43373 | 10/1980 | Japan. | |
| 56-11061 | 3/1981 | Japan. | |
| 56-48759 | 11/1981 | Japan. | |
| 57-54093 | 11/1982 | Japan. | |
| 58-12168 | 3/1983 | Japan. | |
| 58-42975 | 9/1983 | Japan. | |
| 60-28876 | 9/1985 | Japan. | |
| 60-39598 | 11/1985 | Japan. | |

*Primary Examiner*—Brian W. Brown
*Attorney, Agent, or Firm*—Sughrue, Mion, Zinn Macpeak & Seas

[57] ABSTRACT

A camera system in which a balancer is installed on one side of the camera and is linked to the camera body by two arms so that the photographer's hand can be inserted through a space defined by the camera body, the balancer and the arms. The balancer has substantial weight so as to balance the camera during hand held operation. Batteries are installed in the balancer and a flash unit may be incoporated therein. The arms may be rigid or may be a flexible belt. The balancer is preferably spaced from the camera body by an adjustable distance. Electrical contact is provided between the balancer and the camera body through the arms.

20 Claims, 10 Drawing Sheets

CAMERA WITH SIDE-MOUNTED BALANCER

This is a continuation of application Ser. No. 07/373,706 filed June 23, 1989, which is a continuation of application Ser. No. 07/241,728 filed Sep. 8, 1988, now abandoned.

FIELD OF THE INVENTION

This invention relates to a balancer which is used in optical devices such as film cameras and video cameras, to allow the operator to stably hold them.

This invention also relates to a photographic camera with a flash emitting device (hereinafter referred to merely as "a flash", when applicable).

DESCRIPTION OF THE BACKGROUND

Recently, a number of electrical control devices have been built in as integral parts of a camera. Therefore, the power source powering these electrical devices becomes unavoidably bulky.

The power source device comprises a battery box and a plurality of dry batteries loaded in the battery box and is arranged as shown in FIGS. 1–3. FIGS. 1 and 2 show a first example of a conventional camera, and FIG. 2 shows a second example of the conventional camera.

In the first example of the conventional camera shown in FIGS. 1 and 2, the camera body 11 has a bulging shaped grip 12 on the left-hand side as viewed from the front of the camera so that the internal volume is increased. A plurality of batteries 13 are loaded in a battery box within the grip 12. In the second example of the conventional camera shown in FIG. 3, a casing 14 is provided under the camera body 11, and a plurality of batteries 13 are loaded in a battery box set in the lower casing 14.

In the first example of the conventional camera described above, the grip 12 is greatly extended sidewardly, and therefore it is rather difficult for the operator (photographer) to grip the camera. Furthermore, the center of gravity of the camera is on the side of the camera body rather than on the side of the grip 12, and therefor it is rather difficult for the operator to stably hold the camera With the hand.

The second example of the conventional camera is bulkier than the first example. Similarly as in the first example, in the second example, the center of gravity of the camera is on the side of the camera body, and therefore it is rather difficult for the operator to stably hold the camera by hand.

A photographic camera with a flash emitting device is also well known in the art. Two typical examples of the camera of this type are as shown respectively in FIGS. 4 and 5 and in FIG. 6.

In the first example of the conventional camera with flash, as shown in FIGS. 4 and 5, a flash emitting unit 113 is provided at a central part 112a of the camera body 112 which protrudes above a lens barrel 111 in such a manner that the flash emitting unit 113 is retractable. The camera body 112 has a grip 112b on its one side which is expanded toward the front and back of the camera body 112. Batteries 14 and a flash power storage capacitor 115 are set inside the grip 112b.

In the second example of the conventional camera with flash, as shown in FIG. 6, a flash emitting unit 113 is provided at the upper side portion of the camera body 112. Batteries 114 and a flash power storage capacitor 115 are provided inside a grip 112b which is similar than that of the first example of the camera of FIGS. 4 and 5.

In the above-described conventional cameras with flash, it is impossible to provide a sufficiently long distance between the axis of the photographic lens and the flash emitting unit 113. Therefore, the cameras suffer from a so-called "red-eye phenomenon" in which, in the resultant picture the photographed person's eyes are pink. Furthermore, a part of the lens barrel 111 protrudes into the flash illuminating angle. Therefore the light from the flash is partially blocked by the lens barrel 111.

In the second example of the conventional camera, the front of the flash emitting unit 113 may be inadvertently partially covered by the hand holding the grip 112b.

SUMMARY OF THE INVENTION

Accordingly, an object of this invention is to eliminate the above-described difficulties accompanying a conventional camera with a grip.

The foregoing object of the invention has been achieved by the provision of a balancer for an optical device such as a camera which has a grip to be held with a single hand. According to this aspect of the invention the balancer is supported by two coupling members extended from two opposite ends of the grip or near the two opposite ends, respectively, in such a manner that, when the hand is inserted into a space defined by the optical device, the coupling members and the balancer, the balancer is positioned over the back of the hand.

When the camera is held by hand, the balancer is positioned over the back of the hand. That is, the camera body is positioned on one side of the hand on the other side of which the balancer is positioned. Therefore, the center of gravity of the camera comes near the grip. As a result, the weight applied to the hand is reduced as much, and the photographer can hold the camera stably.

If the balancer is so designed as to be held in contact with the back of the hand, then the camera can be held more stably.

Another object of this invention is to eliminate the above-described difficulties accompanying a conventional camera with a flash emitting device.

The foregoing object of the invention has been achieved by the provision of a camera with a flash emitting device in which, according to the invention, a camera body is coupled to a flash casing through two coupling arms provided for the upper and lower ends of one side portion of the camera body. The flash casing includes at least a flash light emitting unit. The flash casing is positioned over the back of the hand inserted into the space formed by the two coupling arms.

In the camera of the invention with flash, the camera body is coupled to the flash casing through the coupling arms so that the flash emitting unit is sufficiently spaced from the photographic lens. Therefore, the above described difficulties of the red-eye phenomenon and the blockage of the light from the lens barrel are eliminated. Furthermore, when the camera body is held by hand, the flash casing is positioned over the back of the hand. Therefore the flash emitting unit will never be covered by the hand holding the camera.

BRIEF DESCRIPTION OF THE DRAWINGS

FIG. 7 is a perspective view of a camera, FIGS. 8 and 9 are a plan view and a front view showing the balancer of the camera, and FIG. 10 is a side view showing the camera held with hand.

FIGS. 11 and 12 are a front view and a plan view showing the balancer coupled the camera body, and FIG. 13 is an enlarged sectional view showing the pivotal coupling structure of a coupling arm in the camera.

FIG. 14 is a perspective view and a sectional view showing the balancer coupled to the camera body with the strap.

FIG. 16 is a sectional view of the balancer, FIG. 17 is a perspective view showing the balancer with the cover opened, and FIG. 18 is an enlarged perspective view showing the electrical connection of a positioning pin and the power supplying wires.

FIG. 19 is a perspective view showing the back of a camera with the flash device, FIG. 20 is a perspective view of the flash device and FIG. 21 is an exploded perspective view showing a flash device mounting structure.

FIG. 22 is a perspective view showing the back of a camera, FIG. 23 is an exploded perspective view showing a flash device disconnected from a camera body, and FIG. 25 is an enlarged sectional view showing the connection of power supplying lines in a coupling arm and an electrical circuit in the camera body.

FIG. 26 is a perspective view of a camera according to the invention, FIG. 27 is a plan view showing the flash casing.

DESCRIPTION OF THE PREFERRED EMBODIMENTS

Preferred embodiments of this invention will be described with reference to the accompanying drawings.

Figure 1:
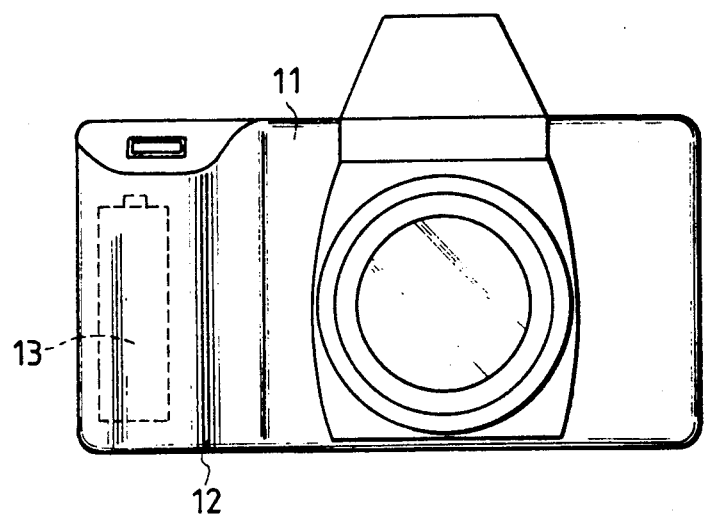
FIGS. 1 and 2 are a front view and a top view of a first example of a conventional camera with a grip.
Figure 2:
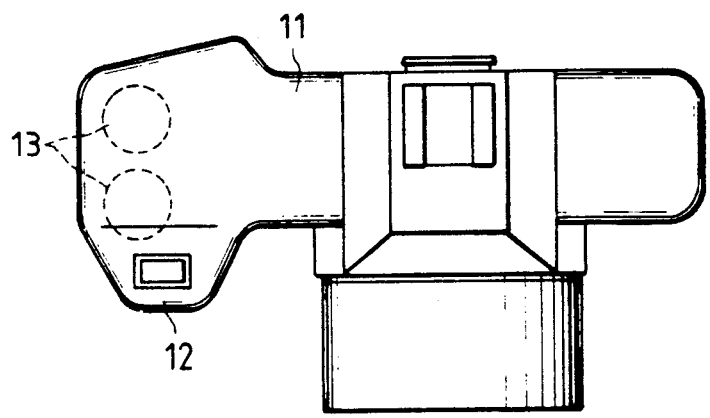
Figure 3:
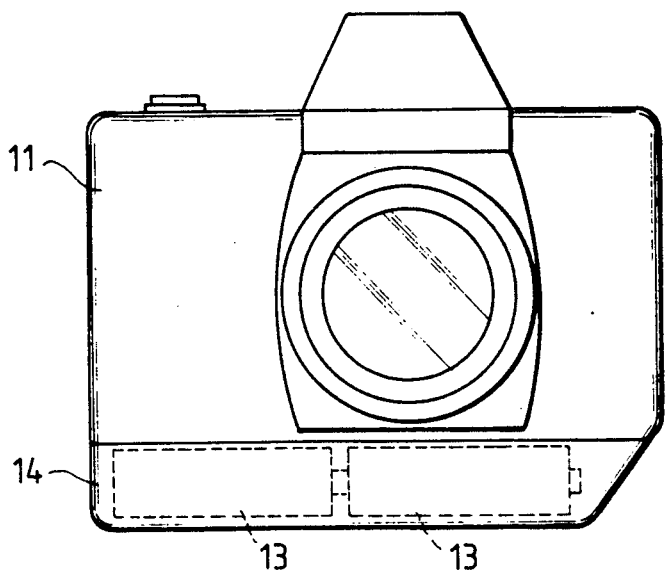
FIG. 3 is a front view of a second example of the conventional camera with a grip.
Figure 4:
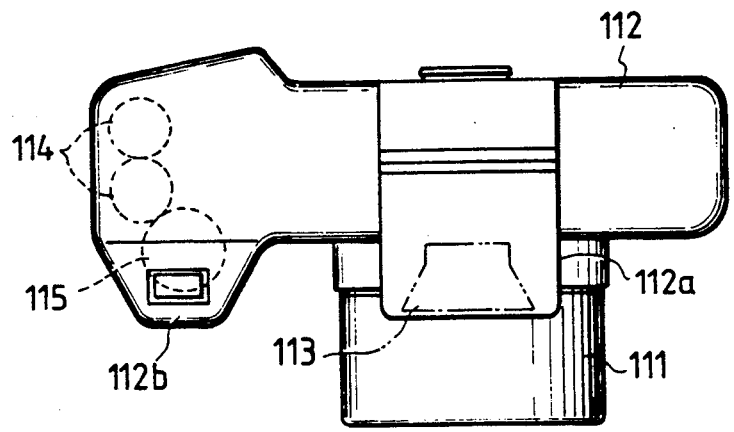
FIGS. 4 and 5 are a top view and a side view of first example of a conventional flash camera with a grip.
Figure 5:
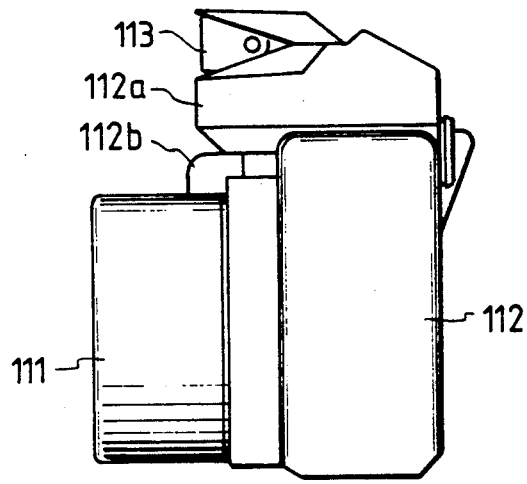
Figure 6:
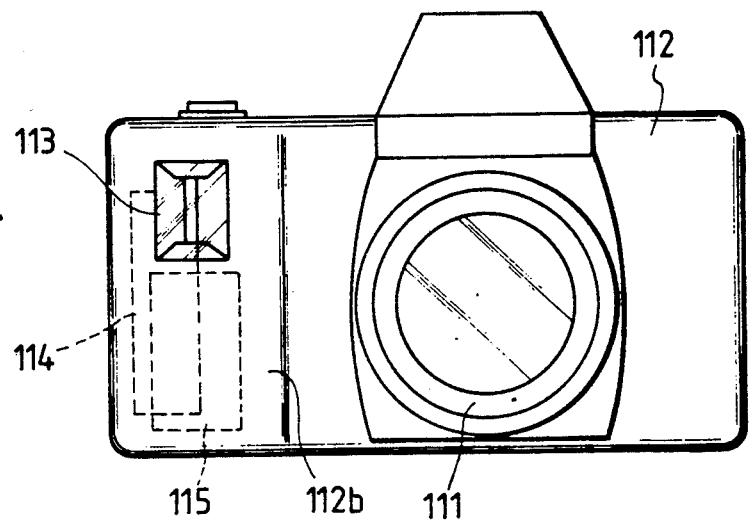
FIG. 6 is a front view of a second example of a conventional flash camera with a grip.
Figure 7:
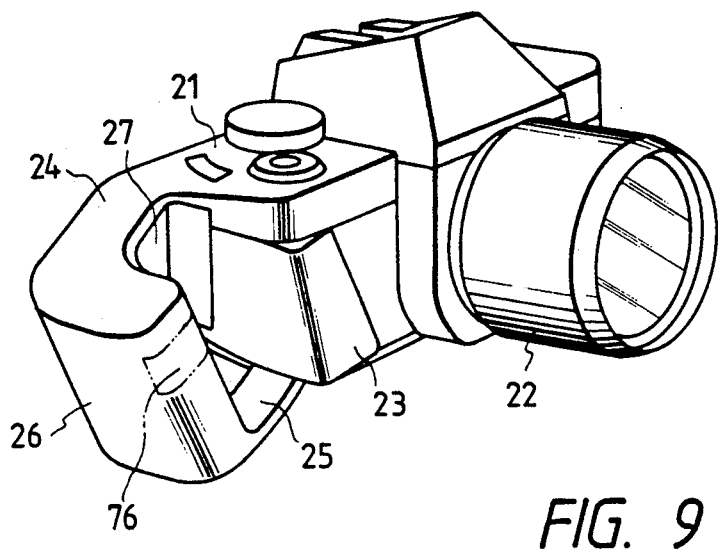
FIGS. 7 through 10 show a first embodiment of the invention in which a balancer is stationary. More specifically.

FIG. 7 is a perspective view showing a camera which is a first embodiment of the invention. FIG. 7 shows a camera body 21 and a lens barrel 22. The camera body 21 has a grip 23 on one side.

Figure 8:
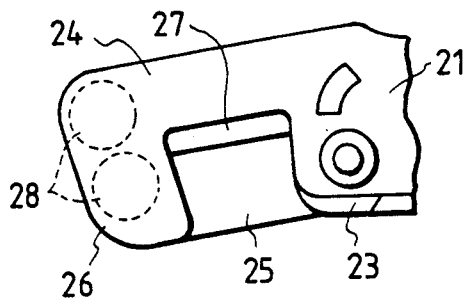
Figure 9:
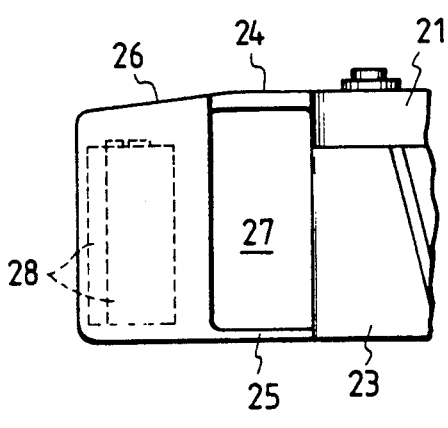

Further in FIG. 7 coupling arms 24 of hard plate extend from the upper and lower ends of the grip 23 sidewardly of the camera body 21. The coupling arms thus extended merge with a balancer 26. As is apparent from FIGS. 8 and 9, the lower arm 25 is in front of the upper arm 24 as viewed from above. The coupling arms 24 and 25, the camera body 21, and the balancer 26 form a space 27 therebetween. A battery box is built in the balancer 26. Batteries 28 are loaded in the battery box. The batteries are connected to a circuit in the camera body through a power cord embedded in the coupling arm 24 or 25.

Figure 10:
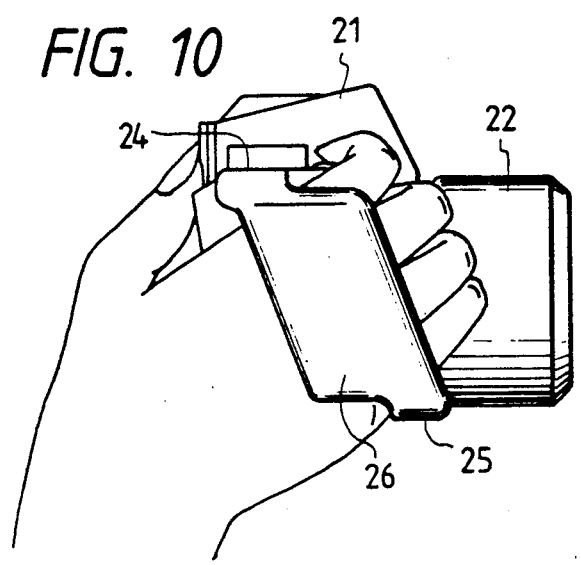

With the camera thus constructed, when the grip 23 is held with the hand inserted into the space 27, as shown in FIG. 10, the balancer 26 is positioned over the back of the hand. In this case the center of gravity of the camera comes near the grip 23, and therefore the weight of the camera applied to the hand is reduced as much so that the operator can held the camera stably.

Figure 11:
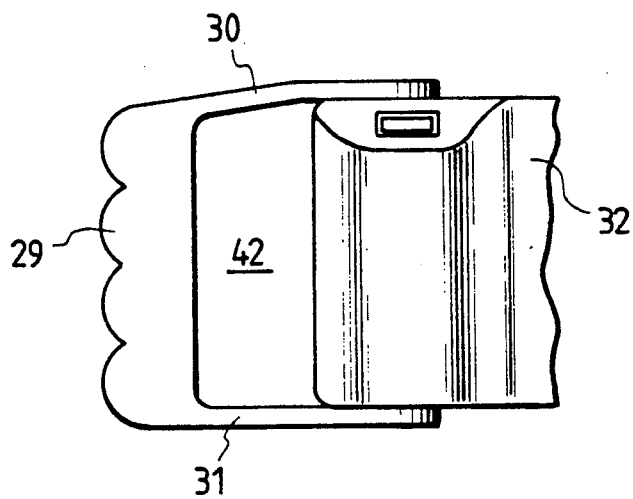
FIGS. 11 through 13 show a second embodiment of the invention in which a balancer is pivotally couple to a camera body. More specifically.
Figure 12:
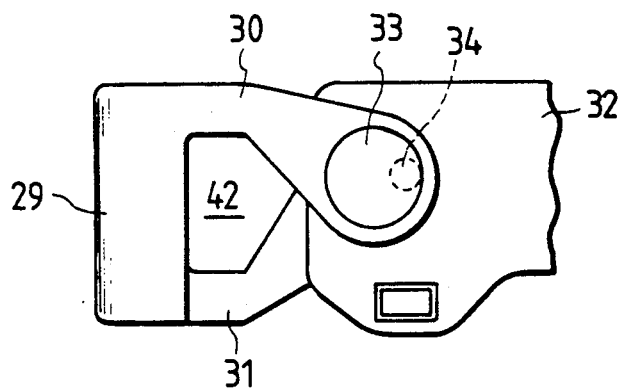

FIGS. 11 and 12 are respectively a front view and a plan view showing a camera which is a second embodiment of the invention.

In the second embodiment, two coupling arms 30 and 31 extend from a balancer 29 in which batteries are loaded. The free ends of the coupling arms 30 and 31 are rotatably coupled to the upper and lower ends of one side portion of a camera body 32.

Figure 13:
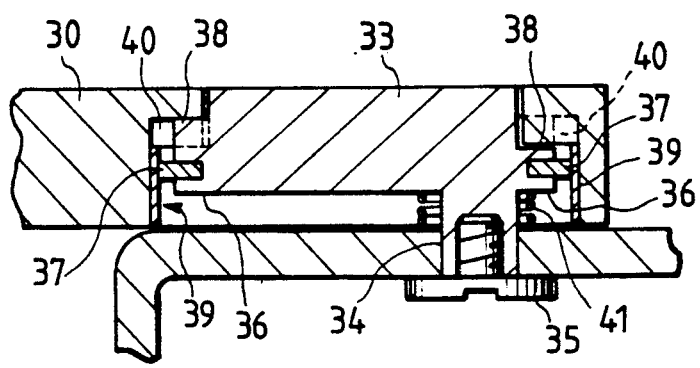

As shown in FIG. 13, a disc-shaped shaft 33 inserted into the coupling arm 30 is rotatably coupled to the camera body 32 by means of an eccentric shaft 34 integral with the disc-shaped shaft 33 and a screw engaged with the eccentric shaft 34. The disc-shaped shaft 33 has a flange 36 formed on the cylindrical wall, and an annular electrode 37 embedded in the flange 36. A crown-shaped uneven surface 38 is formed in the upper surface of the flange 36.

The shaft hole formed in the coupling arm 30 has a cylindrical electrode 39 which is kept in contact with the electrode 37 on the shaft 33, and protrusions 40 engaged with the depressions of the uneven surface 38.

The cylindrical electrode 39 is connected to the power source in the balancer 29 through the power supplying cord buried in the coupling arm 30, whereas the electrode 37 is connected to the electrical circuit in the camera body 32. Thus, the electrical circuit in the camera body 32 is connected to the power source through these electrodes 37 and 39.

The disc-shaped shaft 33 is pushed upwardly by means of a compression spring 41 so that the protrusions 40 are selectively engaged with depressions of the uneven surface 38, whereby the angular position of the disc-shaped shaft 33 with respect to the coupling arm 30 is fixed.

Similarly as in the upper coupling arm 30, the lower coupling arm 31 is pivotally coupled to the lower end of the one side portion of the camera body and provides a pivoting electrical contact. The circuit in the camera body is connected to the battery power source through the two parts of the pivotal coupling means.

In the second embodiment described above, when the disc-shaped shaft 33 is pushed downwardly against the elastic force of the compression spring 41, the protrusions 40 are disengaged from the depressions of the uneven surface 38. Under this condition, the disc-shaped shaft 33 can be turned. When, after the disc-shaped shaft 33 is turned about the eccentric shaft 34, the force of depression applied to the disc-shaped shaft is released, a new angular position of the disc-shaped shaft 33 with respect to the coupling arm 30 is determined. The above description is equally applicable to the lower coupling arm 31.

The distance between the balancer 29 and the camera body 32 can be adjusted by operating the coupling arms 30 and 31 as described above.

In this case, the balancer will contact with the back of the hand inserted into the space 42, and therefore the photographer can stably hold the camera with the hand.

Figure 14:
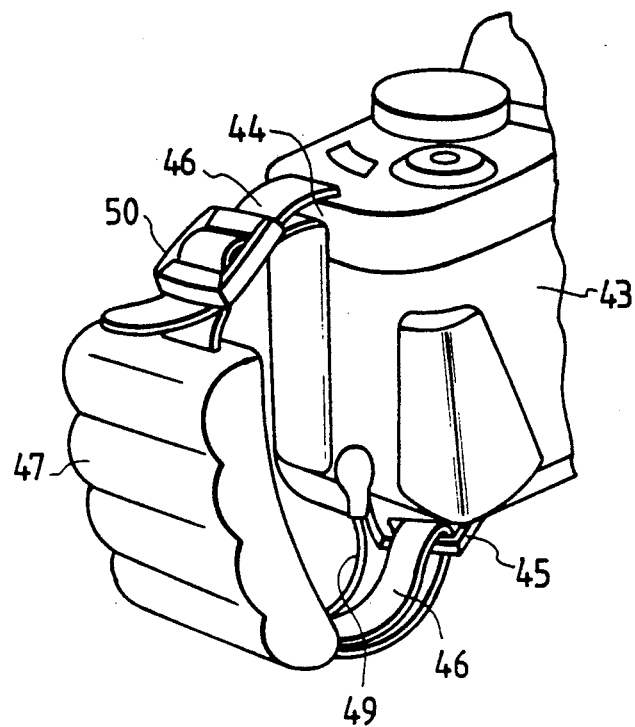
FIGS. 14 and 15 show a third embodiment of the invention in which a balancer is coupled to a camera body with a strap. More specifically.
Figure 15:
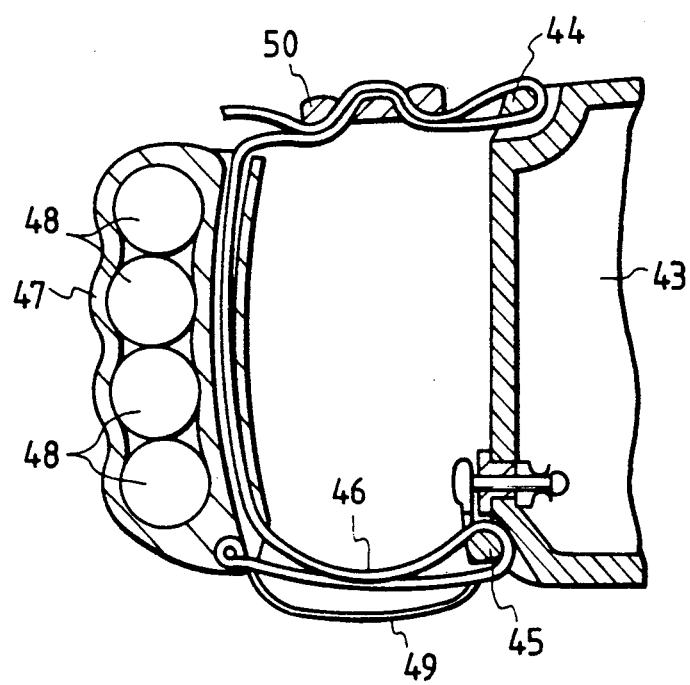

FIG. 14 is a perspective view showing a part of a camera with a balancer which is a third embodiment of the invention, and FIG. 15 is a sectional view thereof.

In the third embodiment, as shown in FIGS. 14 and 15, the balancer 47 is mounted on a conventional hand strap 46 secured to suspending metal parts 44 and 45 which are embedded in a camera body 43. Power source batteries 48 loaded in the balancer 47 are connected through a power cord 49 to the electrical circuit in the camera body 43.

The hand strap 46 is flexible, and its length can be adjusted by means of an adjusting ring 50. Therefore, the distance between the balancer 47 and the camera body 43 can be set to a suitable value.

Figure 16:
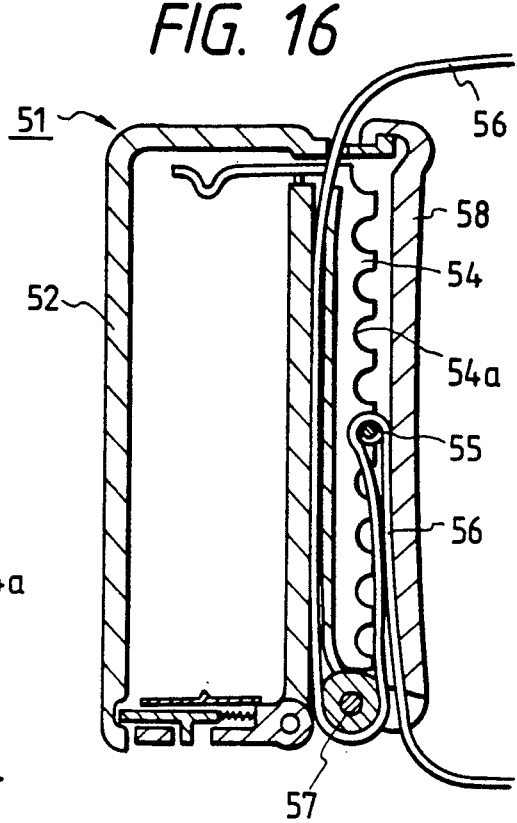
FIGS. 16 through 18 show a fourth embodiment of the invention in which a balancer is coupled to a camera body through a belt in which power supplying wires are buried. More specifically.
Figure 17:
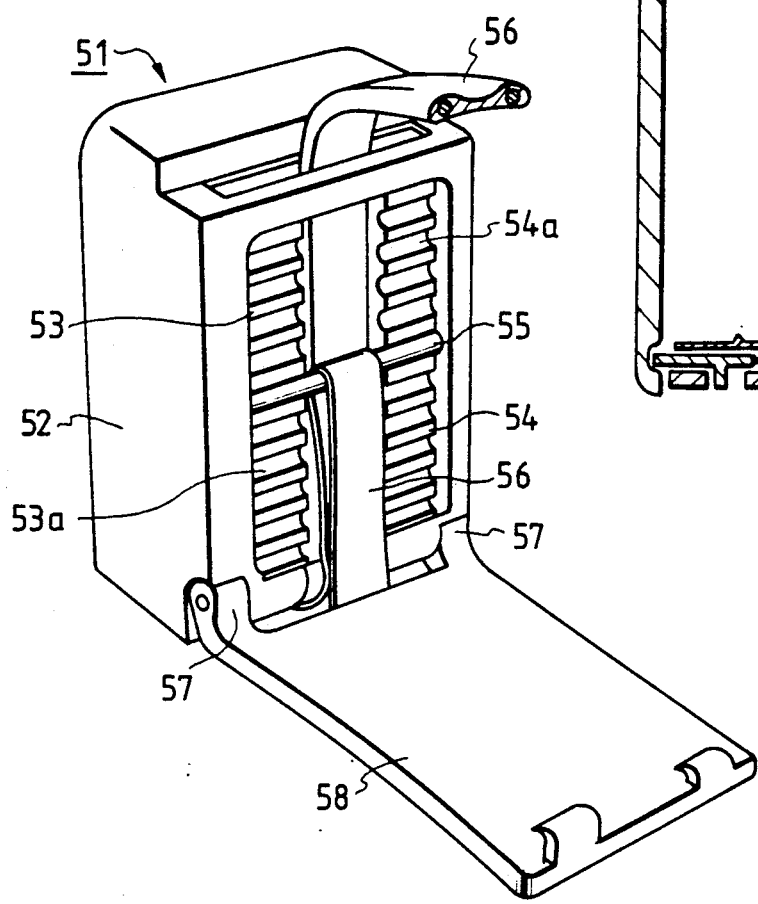

FIG. 16 is a sectional view showing a balancer which is a fourth embodiment of the invention, and FIG. 17 is a perspective view of the balancer whose cover is opened.

In the embodiment, a balancer 51 is designed as follows. Two vertically elongated electrode plates 53 and 54 are provided on one side of a box-shaped casing 52 which is a battery box. A positioning pin 55 is engaged with horizontal grooves 53a and 54a cut in the electrode plates 53 and 54. One end 55a of the positioning pin 55 is engaged with a horizontal groove 53a in the one electrode plate 53 and the other end 55b is engaged with a horizontal groove 54a in the other electrode plate 54. A belt 56 in which power supplying wires are buried is laid over the middle 55c between the two ends 55a and 55b of the positioning pin 55.

Figure 18:
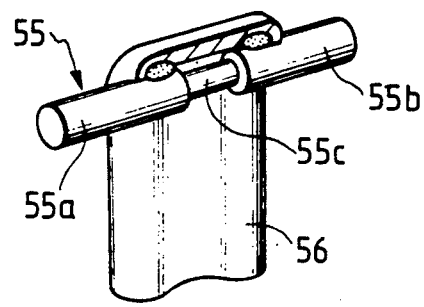

The two ends 55a and 55b of the positioning pin 55 are made of electrically conductive material, and the middle 55c is made of insulating material. The power supplying wires in the belt 56 are electrically connected to the two ends 55a and 55b as shown in FIG. 18.

The belt 56 is flexible. One end portion of the belt 56 pulled upwardly out of the box-shaped casing 52 through the space between the electrode plates 53 and 54 is fastened to one of the suspending metal parts 44 or 45 provided on one side portion of the camera body 43, whereas the other end portion of the belt 56 pulled downwardly after being land over pivotal coupling means 57 and the positioning pin 55 is fastened to the other suspending metal part 44 or 45. The power suppling wires in the belt 56 are connected to the electrical circuit in the camera body.

A cover 58 supported by the pivotal coupling means 57 is placed on the box-shaped casing 52 in such a manner as to cover the electrode plates 53 and 54. Its upper end is locked to the box-shaped casing 52. The above-described electrode plates 53 and 54 are connected to opposing electrodes of the batteries loaded in the box-shaped casing 52.

In the fourth embodiment of the invention, the length of the belt pulled out can be changed by displacing the positioning pin 55, whereby the distance between the balancer 51 and the camera body can be adjusted. It goes without saying that even when the distance is adjusted as described above, the power supplying circuit is established by the electrode plates 53 and 54, the positioning pin 55, and the power supplying wires.

Preferred embodiments of the camera with flash for this invention will now be described with reference to the accompanying drawings.

Figure 19:
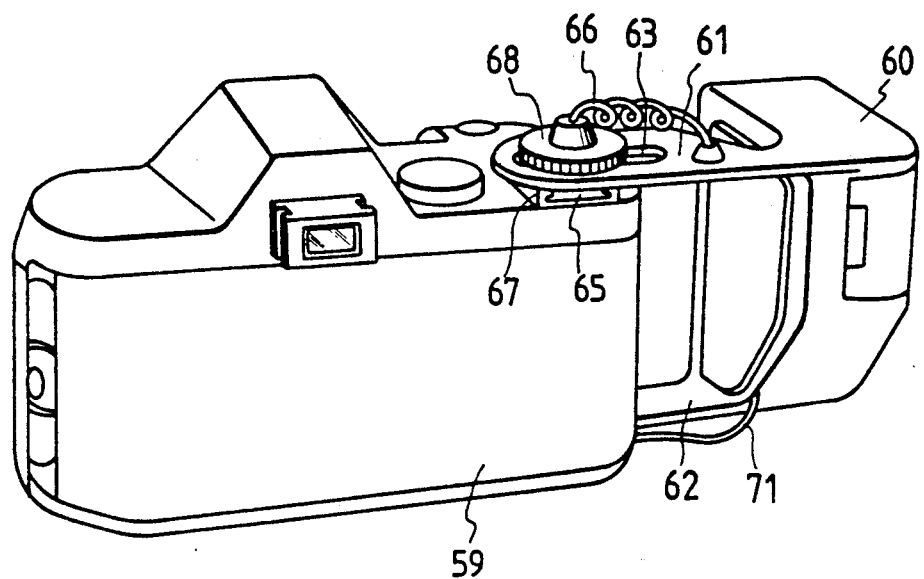
FIGS. 19 through 21 show a fifth embodiment of the invention in which a flash device is employed as a balancer. More specifically.

FIG. 19 is a perspective view showing the rear of a camera which is a fifth embodiment of the invention. In the fifth embodiment, a flash device 60 is detachably coupled to a camera body 59 by means of two coupling arms 61 and 62.

Figure 20:
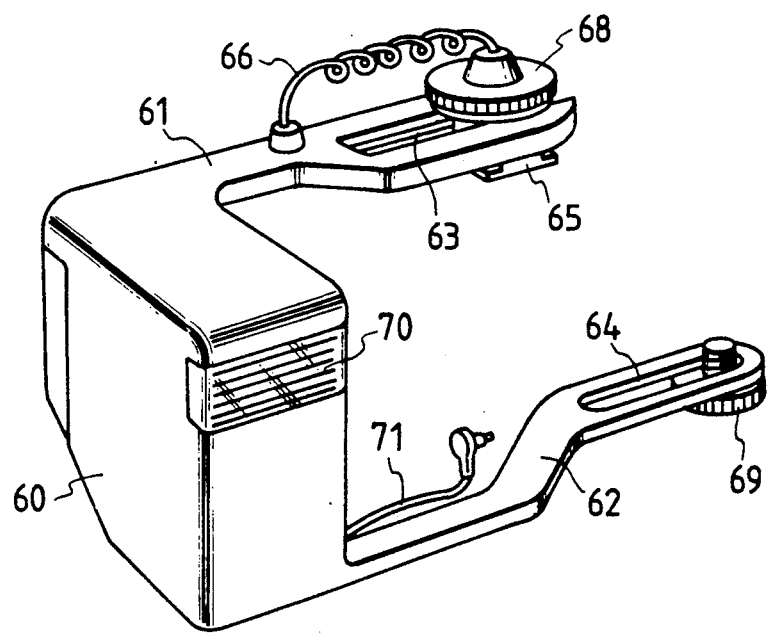
Figure 21:
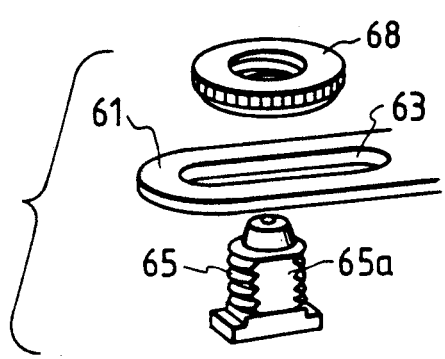

As shown in FIG. 20 the flash device 60 is integrally formed with the upper and lower arms 61 and 62, which have elongated holes 63 and 64, respectively. A screw member 65, as shown in FIG. 21 in detail, is slidably fitted in the elongated hole 63 of the upper arm 61. The screw member 65 comprises a male-threaded screw body and protrusions extending from one end of the screw body in such a manner that it is perpendicular to the axis of the screw body. The screw body has flat surfaces 65a on both sides which confront with the side walls of the elongated hole 63. Furthermore, the screw member 65 has trigger terminals at the lower end face which are electrically connected to a trigger cord 66. The flat surfaces 65a prevent the coupling arm 61 from rotating with respect to the screw body.

The laterally extended protrusions of the screw member 65 is inserted into a hot shoe 67 formed on the top of one side portion of the camera body 59. A retaining screw 68 engaged with the screw body of the screw member 65 is tightened so that the upper arm 61 is fixedly secured to the camera body 59. A retaining screw 69 inserted into the elongated hole 64 of the lower arm 62 is engaged with a tripod tap hole formed in the lower end face of the camera body 59 so that the lower arm 62 is fixedly secured to the camera body 59.

The flash device 60 accommodates a flash emitting mechanism comprising a battery, a flash power storage capacitor, and a flashlight emitting unit. A flash light window 70 is formed in the front wall of the flashlight emitting unit so as to confront the flash emitting unit.

In the flash device 60, the trigger cord 60 is partially buried in the connecting arm 61 and electrically connected to the circuit therein. A power cord 71 for connecting the battery in the flash device 60 to the camera body 59 extends from the flash device 60 so that it is connected to the camera body 59 when required.

In the fifth embodiment, the flash device 60 is positioned over the back of the photographer's hand holding the camera body. The space between the camera body 59 and the flash device 60 can be adjusted to suitably receive the hand holding the camera body by sliding the retaining screws 68 and 69 in the elongated holes of the coupling arms 61 and 62. Therefore, the photographer can hold the camera more stably.

The fifth embodiment eliminates the above-described difficulties that the red-eye phenomenon occurs and that the flash light is obstructed by the lens barrel in a photographic flash operation. In addition, the fifth embodiment has the following effect: By adjusting the positions of the retaining screws 68 and 69 with respect to the elongated holes 63 and 64 of the coupling arms 61 and 62, the space between the camera body 59 and the flash casing 60 can be changed to suitably accommodate the hand of the photographer holding the camera. Thus, the camera can be held more stably.

Figure 22:
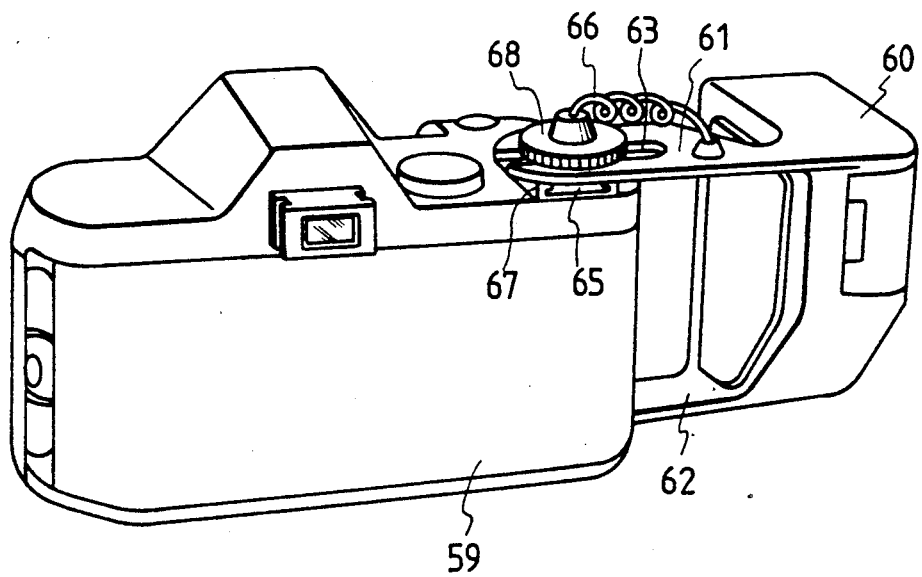

FIG. 22 is a perspective view showing the rear of a camera which is a sixth embodiment of the invention.

Figure 23:
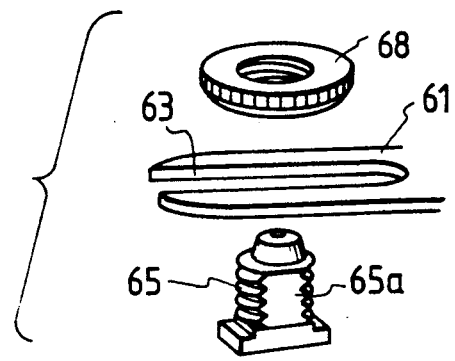
FIGS. 22 through 25 show a sixth embodiment of the invention in which power supplying lines are buried in coupling arms. More specifically.

The specific feature of the sixth embodiment resides in that, as shown in FIG. 23, the elongated hole 63 formed in the upper arm 61 is opened at the outer end. That is, the upper arm is shaped like a two-prong fork, and in that power supplying lines 71 and 72 are buried in the lower arm 62. The remaining components are the same as those in the above-described fifth embodiment.

Figure 24:
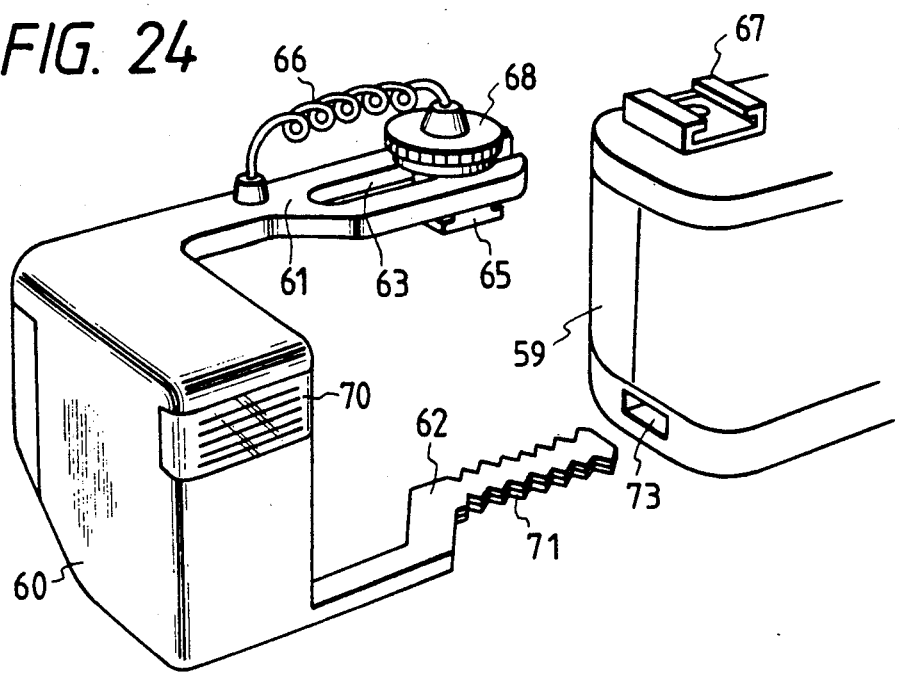

As shown in FIG. 24, the coupling arm 62 has saw-tooth-shaped regions on both sides. The power supplying lines 71 and 72 are laid along the saw-tooth-shaped regions and are connected to a power source circuit in the flash device 60.

Figure 25:
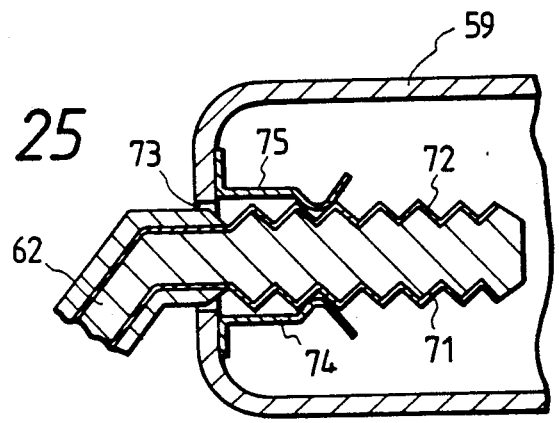

A hole 73 is formed in the lower part of the one side portion of the camera body 59 to receive the coupling arm 62. As shown in FIG. 25, electrical contacts 74 and 75 are provided in the hole 73 so that they are engaged with the power supplying lines 71 and 72 extending along the saw-tooth-shaped regions of the coupling arm 62.

In the case of the sixth embodiment, the screw member 65 is inserted into the hot shoe 67 in advance, and is then engaged with the slot 63 of the coupling arm 61 while the lower coupling arm 62 is inserted into the hole 73. Under this condition, the retaining screw 68 is tightened so that the flash device 60 is fixedly secured to the camera body 59.

In the sixth embodiment, as the screw member is displaced relative to the elongated hole 63 of the coupling arm 61, the lower coupling arm 62 is moved relative to the electrical contacts 74 and 75 in such a manner that the electrical contacts 74 and 75 are kept in contact with the power supplying lines 71 and 72 laid along the saw-tooth-shaped regions of the coupling arm 36.

In the above-described fifth and sixth embodiments, the flash device 60 is detachably coupled to the camera body. However, they may be modified as follows. The flash mechanism may be built in the stationary balancer 26 as shown in FIG. 7, and a light emitting window 76 is formed as indicated by the phantom line in FIG. 7.

In the case where the flash device 60 is not employed, the balancer 47 shown in FIGS. 14 and 15 may be coupled to the suspending metal parts 44 and 45 provided at the upper and lower ends of the one side portion of the camera body 59 (or the right-handed-side portion of the camera body in FIG. 19 or 22).

Figure 26:
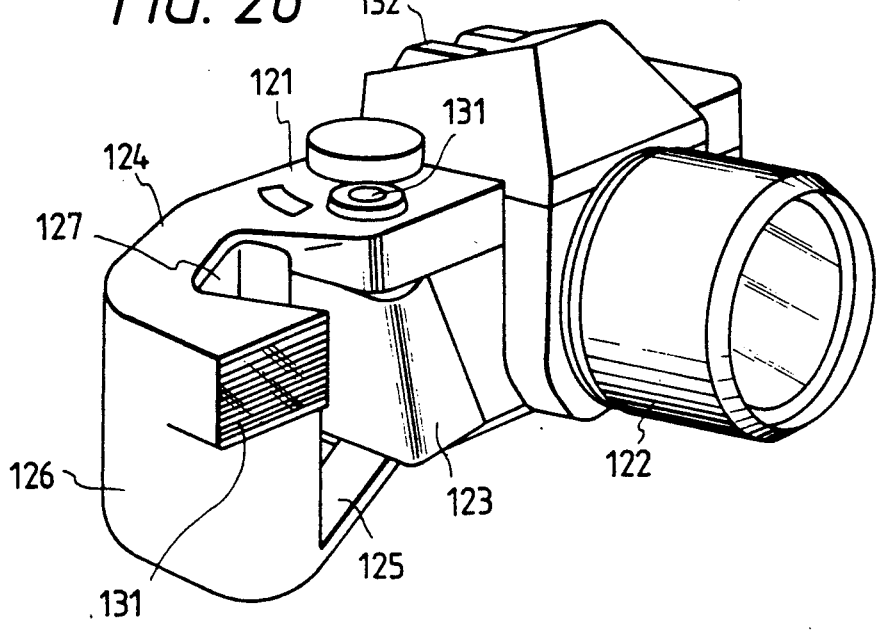
FIGS. 26 through 28 show a seventh embodiment of this invention in which a camera body is integral with a flash casing. More specifically.

FIG. 26 is a perspective view showing a single-lens reflex camera which is a seventh embodiment of this invention. FIG. 26 shows a camera 121, a lens barrel 122; a grip 123 forming one side portion of the camera body 121.

Two coupling arms 124 and 125 are connected to the upper and lower ends of the one side portion of the camera body 121, respectively, in such a manner that they extend sidewardly of the camera body 121 and merge with a flash casing 126.

Figure 27:
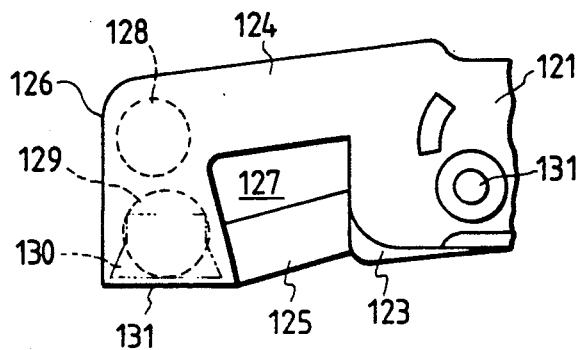
Figure 28:
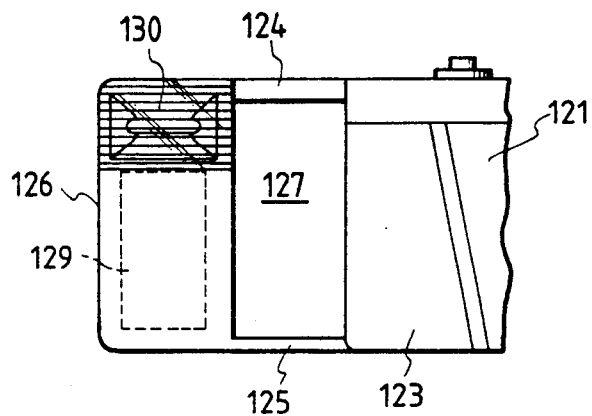

As is apparent from FIG. 27, the lower arm 125 is provided in front of the upper arm 124 as viewed from above. The two arms 124 and 125, the camera body 121, and the flash casing 126 form a space 127 into which the photographer's fingers are inserted to grasp the grip 123. A trigger button 131 can be operated by a finger of the hand inserted in the space 131.

A well-known flash emitting mechanism comprising a battery 128, a flash power storage capacitor 129, a flash emitting unit 130 and other necessary circuit components is built in the flash casing 126. A light emitting window 131 for the flash emitting unit 130 is formed in the upper portion of the front wall of the flash casing 126.

Lead wires are buried in the coupling arm 124 or 125 to connect an electrical circuit in the flash casing 126 to that in the camera body 121.

In the case of the above-described camera, the photographer's fingers are inserted into the space 127 to hold the grip 123 and to activate the trigger button 131 when a picture is taken. In this case, the flash casing 126 is positioned over the back of the hand and further the flash emitting unit 130 is sufficiently spaced away from the photographic lens. These two facts effectively eliminate the above-described difficulties that the red-eye phenomenon occurs in a flash photo and that the flash light is partially intercepted by the lens barrel 122.

As was described above, the camera body 121 is positioned over the flat of the hand holding the grip 123 while the flash casing 126 is positioned over the back of the hand, with the center of gravity of the camera set near the grip. Therefore, when the photographer poses in a photographer posture, he can stably hold the camera.

In the above-described embodiment, the flash emitting unit 130 is an auxiliary flash light emitting unit. A main flashlight emitting unit is engaged with a hot shoe on the top of the camera body.

While a few embodiments of the invention have been illustrated and described in detail, it is particularly understood that the invention is not limited thereto or thereby. For instance, the camera may be so designed that only the flash emitting unit is provided in the flash casing and the other flash emitting components such as the battery and the capacitor are built into the camera body.

As was described above, the camera body is coupled to the flash casing through the coupling arms provided for the upper and lower ends of the side portion of the camera body. Therefore, when the camera is held with the hand inserted into the space formed by the coupling arms, the camera body and the flash casing, the flash casing is positioned over the back of the hand, and therefore the flashlight emitting unit is sufficiently spaced away from the photographing lens.

As a result, the red-eye phenomenon is eliminated, and the lens barrel will not protrude into the flash light illuminating angle. That is, in practice the flashlight is scarcely obstructed by the lens barrel. Furthermore, since the flash casing is positioned over the back of the hand, the difficulty that the flashlight emitting window is covered by the hand is eliminated.

Figure 29:
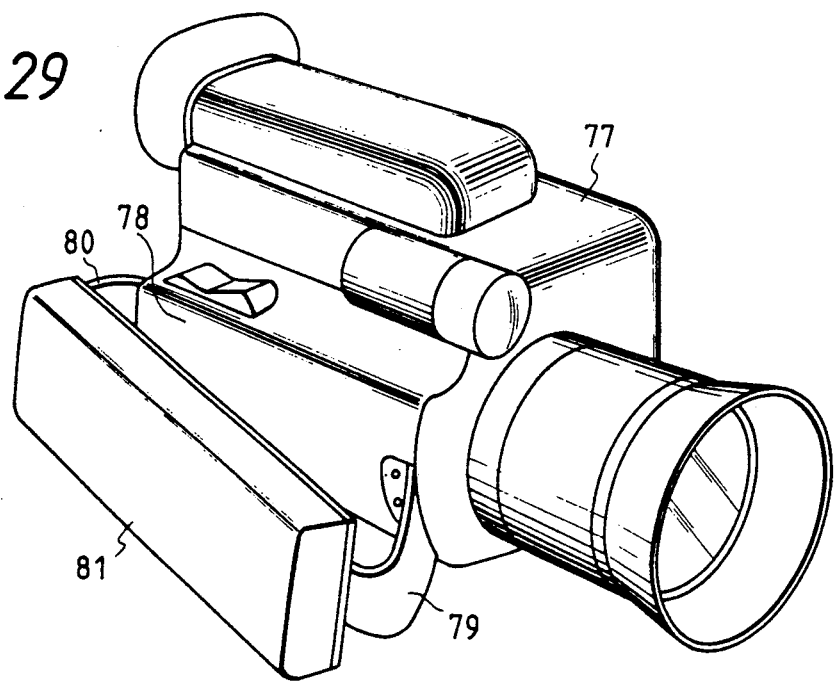
FIG. 29 is a perspective view showing a video camera which is eighth embodiment of the invention.

FIG. 29 shows a video camera which is an eighth embodiment of the invention. In the eighth embodiment, a balancer 81 accommodating a battery is coupled to coupling arms 79 and 80 secured to the front and rear ends of a grip 78 forming one side portion of the video camera 77. In the embodiment, the coupling arms 79 and 80 are of hard plates. However, they may be replaced by flexible belts. Similarly as in the above-described embodiments, the balancer 81 may be so modified that it is detachably coupled to the video camera body.

As was described above, when the photographer holds the optical device such as a camera with the hand, the balancer (perhaps a flash unit) is positioned over the back of the hand so that the balancer and the optical device are balanced with each other, and the weight applied to the hand is reduced as much. Therefore, he can hold the optical device stably.

What is claimed is:

1. A camera system, comprising:
   a camera having a camera body and a principal optical axis: and
   balancing means mounted on a side of said camera body away from said principal optical axis, with a space for insertion of a hand of an operator holding said camera system during a photographic operation being formed between said balancing means and said side of said camera body, whereby said balancing means balances said holding of said camera system.

2. A camera system as recited in claim 1, wherein said balancing means contains electrical means for operating said camera.

3. A camera system as recited in claim 2, wherein said electrical means comprises at least one battery.

4. A camera system as recited in claim 3, wherein said balancing means is coupled to said camera body by at least one coupling arm which is flexible and detachably secured to said side of said camera body.

5. A camera system as recited in claim 3, wherein said balancing means is coupled to said camera body by at least one coupling arm which is integrally formed with said balancing means and said camera body.

6. A camera system as recited in claim 5, wherein said electrical means includes a flash unit provided with a flash emitting surface.

7. A camera system as recited in claim 5, said balancing means is coupled to said camera body by upper and lower coupling arms, and wherein said upper coupling arm is mounted more rearwardly of a front surface of said camera body than said lower coupling arm, whereby a vertically passing space is formed between said coupling arms, said balancing means and said side of said camera body.

8. A camera system as recited in claim 3, wherein said balancing means is coupled to said camera body by at least one coupling arm which is rigid and detachably mounted on said camera body.

9. A camera system as recited in claim 8, wherein said electrical means includes a flash unit provided with a flash emitting surface.

10. A camera system as recited in claim 9, wherein said balancing means is coupled to said camera body by coupling means comprising at least one coupling arm which has a slot formed in an end thereof adjacent said camera body and further comprising:
    a shoe mounted on said camera body;
    a screw member having a lower part engageable with said shoe and an upper part having a male screw portion passable through said slot in said one coupling arm; and
    a nut tightenable on said male screw portion so as to fasten said one coupling arm to said camera body.

11. A camera system as recited in claim 10, further comprising:
    an electrical cord connected between said balancing means and said screw member and wherein said shoe is a hot shoe.

12. A camera system as recited in claim 10, wherein said coupling means further comprises a second coupling arm extending between said balancing means and said camera body and having a slot formed therein in an end adjacent said camera body and further comprising fastening means for fastening said second coupling arm through said slot thereof to said camera body.

13. A camera system as recited in claim 10,
    wherein said slot of said one coupling arm is open ended;
    wherein a receiving slot is formed in a side of said camera body; and
    wherein said coupling means comprises a second coupling arm secured to said balancing means and insertable into said receiving slot.

14. A camera system as recited in claim 13, further comprising:
    two electrical contacts on an interior of said camera body on either side of said receiving slot and biased toward each other;
    saw-tooth regions formed on opposing sides of said second coupling arm on an end thereof insertable into said receiving slot; and
    two power supplying lines laid on said saw-tooth regions and engageable with said electrical contacts.

15. A camera system as recited in claim 3, wherein said balancing means is coupled to said camera body by at least one coupling arm integrally formed with said balancing means and pivotally coupled to said camera body.

16. A camera system as recited in claim 15, wherein said coupling arm is coupled to said camera body via pivotal coupling means comprising a disc rotatable in one of said camera body and said one coupling arm and an eccentric shaft rotatable in the other of said camera body and said one coupling arm, whereby a distance between said side of said camera body and said balancing means is adjustable.

17. A camera system as recited in claim 3,
    wherein said balancing means comprises a case having a rack formed therein, said rack having two parallel rack portions electrically insulated from each other, and a pin having two end portions insulated from each other and engageable with respective ones of said rack portions; and
    wherein said balancing means is coupled to said camera body by coupling means comprising a flexible belt having opposite ends engageable with said camera body and a middle portion windable around said pin, said belt having two electrical conductors contactable with respective ones of said two end portions of said pin.

18. A camera system as recited in claim 1, wherein said balancing means is positioned over a back of said hand inserted in said space.

19. A camera system as recited in claim 1, further comprising an operating member operable by a finger of said hand inserted in said space.

20. A camera system as recited in claim 1, wherein said balancing means is coupled to said camera body by two coupling arms coupled between opposing ends of said balancing means and ends of said side of said camera body, wherein said side of said camera body, said balancing means and said two coupling arms form said space for insertion of said hand.

* * * * *